United States Patent [19]

Mungo

[11] Patent Number: 5,158,511
[45] Date of Patent: Oct. 27, 1992

[54] WHEELS INCORPORATING BRAKING DISCS

[75] Inventor: Keith Mungo, Liverpool, England

[73] Assignee: Sab Wabco Holdings, B.V., Heerhugowaard, Netherlands

[21] Appl. No.: 666,521

[22] Filed: Mar. 11, 1991

[30] Foreign Application Priority Data

Mar. 14, 1990 [GB] United Kingdom ............... 9005680

[51] Int. Cl.[5] .............................................. F16D 65/12
[52] U.S. Cl. ........................... 188/218 XL; 188/73.2; 192/70.13; 192/107 R
[58] Field of Search ................. 188/218 XL, 73.2; 192/70.13, 107 R

[56] References Cited

U.S. PATENT DOCUMENTS

| | | | |
|---|---|---|---|
| 1,888,779 | 11/1932 | Tower | 192/107 R |
| 2,869,688 | 1/1959 | Busch | 188/218 XL |
| 3,422,936 | 1/1969 | Marcheron | 192/107 R X |
| 3,606,937 | 9/1971 | Falch et al. | 188/218 XL |
| 3,877,551 | 4/1975 | Gebhardt et al. | 188/218 XL |
| 4,280,598 | 7/1981 | Pollinger | 188/218 XL |
| 4,449,621 | 5/1984 | Geppert | 192/107 R X |
| 4,825,981 | 5/1989 | Otto et al. | 188/218 XL |

FOREIGN PATENT DOCUMENTS

| | | |
|---|---|---|
| 2133235 | 1/1973 | Fed. Rep. of Germany . |
| 2315134 | 10/1974 | Fed. Rep. of Germany . |
| 2607886 | 6/1988 | France .................. 188/218 XL |
| 871861 | 7/1961 | United Kingdom ......... 188/218 XL |
| 2128695 | 5/1984 | United Kingdom . |

Primary Examiner—George E. A. Halvosa
Attorney, Agent, or Firm—Oblon, Spivak, McClelland, Maier & Neustadt

[57] ABSTRACT

The present specification discloses a wheel comprising a central hub and an outer rim interconnected by a web. A pair of annular braking discs are mounted one on each side of the web, each annular braking disc being secured to the web by at least two attachment elements. Each annular braking disc comprises at least two curved segments, each curved segment having two end edge regions, each end edge region of each segment overlapping an end edge region of an adjacent segment so that a continuous annular braking disc with a smooth braking surface is provided. The overlapping end edge regions have sections which extend generally axially of the braking disc in opposite directions, the sections interengaging with each other, with a spring being located between the overlapping end regions to thus bias the overlapping end regions circumferentially with respect to the annular braking disc, to thus securely interengage the segments.

13 Claims, 4 Drawing Sheets

WHEELS INCORPORATING BRAKING DISCS

DESCRIPTION

The present invention relates to a wheel incorporating a braking disc.

In particular the present invention relates to a wheel, primarily for use on railway vehicles, comprising a central hub and an outer rim interconnected by a web, an annular braking disc being mounted on each side of the wheel.

Certain known wheels of the above described construction have integral annular braking discs which are merely bolted to the web of the wheel. Such integral annular braking discs are secured to the web by attachment means which can, for example, be merely bolts which directly bolt the braking disc to the web. Alternatively, specific connection assemblies which are bolted to the web can be used, the connection assemblies being connected to the braking disc so as to allow for the expansion and contraction of the braking disc as it is heated and cooled during braking.

Such a connection assembly is disclosed in application Ser. No. 07/615,701 filed Nov. 5, 1990 assigned to the same assignee as the present application, the connection assembly comprising a steel spring mounting plate which is located in a radial dovetail slot machined in the back face of the annular disc. Three equi-spaced mounting plates are preferably used, each mounting plate being bolted to the web of the wheel. Tightening of the bolts causes the spring mounting plates to deflect, thus causing an axial force to be applied to the annular braking disc.

Another such connection assembly is disclosed in U.S. Pat. No. 5,101,940 assigned to the same assignee as the present application, the connection assembly comprising a mounting block which is located in a radial guideway machined in the back face of the annular braking disc. The mating faces of both the block and guideway incorporate radial half holes which form enclosures into each of which is fitted a roll pin. The roll pins are retained in these enclosures by upstanding projections on the back of the annular braking disc and by lateral projections on the mounting block. Preferably four equi-spaced apart mounting blocks are provided on the back of each braking disc, each mounting block being bolted to the web of the wheel. Thermal expansion of the braking disc is catered for by the disc being able to slide radially along the mounting blocks on the roll pins.

Whatever attachment means are used to secure the braking discs to a wheel web, the provision of integral annular braking discs, though preferable, does cause difficulty if disc replacement is ever required during the life of a wheel, such disc replacement necessarily requiring the disassembly of the axle on which the wheel is mounted. To thus simplify matters it is known to provide segmented braking discs. However, the problem occurs in that the segments can warp due to the continued heating and cooling occurring as a result of braking, so that the contiguous edges of adjacent segments can present a raised edge which may well reduce the life of a friction pad besides affecting brake performance.

The aim of the present invention is to provide a segmented braking disc arrangement wherein the contiguous edges of adjacent segments are maintained in their relative positions throughout the life of the braking disc.

According to the present invention there is provided a wheel comprising a central hub and an outer rim interconnected by a web, a pair of annular braking discs being mounted one on each side of the web, each annular braking disc being secured to the web by at least two attachment means, and comprising at least two curved segments, each curved segment having two end edge regions, each end edge region of each segment overlapping an end edge region of an adjacent segment so that a continuous annular braking disc with a smooth braking surface is provided, the overlapping end edge regions having sections which extend generally axially of the braking disc in opposite directions, said sections interengaging with each other, with spring means being located between said overlapping end regions to thus bias the said overlapping end regions circumferentially with respect to the annular braking disc, to thus securely interengage the segments.

Preferably the overlapping end edge regions are each located adjacent to a respective attachment means with the braking disc segment secured by the said adjacent attachment means to the wheel web, overlapping the contiguous end edge region of the adjacent segment. In this way the attachment means securely holds the end edge region of the adjacent segment against the tendency to warp and this maintains the smooth planar profile of the braking surface of the disc.

By virtue of the fact that the overlapping end edge regions of the brake disc segments of the present invention cause the segments to be effectively interlocked with each other, the segmented brake disc as a whole has a hoop stress characteristic which is virtually the same as a unitary construction brake disc, the segmented brake disc resisting centrifugal forces in the same manner as a unitary construction brake disc and enabling a minimal number of attachment means to be used to secure the brake disc to the wheel web. This is in contrast to prior art segmented discs wherein a large number of attachment means were required to secure a disc segment to a wheel web and resist centrifugal force.

In a preferred embodiment of the present invention each annular braking disc is comprised of two like curved segments and the two diametrically opposed overlapping end regions each include two spring means, each in the form of a cylindrical roll pin.

Whilst the above described embodiment of the present invention utilises two like curved segments which interlock together to form a completed brake disc, segments with different angular extents can be alternatively used, e.g. one segment could have a 270° angular extent whilst the other segment would then have a 90° angular extent, to thus together form a complete disc. Due to the overlap of the brake disc segments of the present invention, two like curved segments must necessarily be constructed from two annular disc blanks. Thus for two braking discs for a wheel, four annular disc blanks are required for manufacturing purposes. However advantage can be gained in respect of the manufacture of braking discs from different shaped segments. To explain, if one segment of each braking disc has a 270° angular extent and the other has a 90° angular extent, then clearly three braking discs can be manufactured from four complete disc blanks, three blanks being used to produce the 270° segments whilst one disc blank can produce the required three 90° segments. Thus three discs result from four blanks as opposed to two discs from four blanks when like-shaped segments are used. This is a clear saving manufacturewise. When different shaped segments are used, the attachment means are preferably located in the middle of the smaller segment and the end regions of the larger segment preferably overlap the end regions of the small segment to at least reduce possible warp.

When the attachment means in the preferred embodiment takes the form of the connection assemblies of either U.S. application Ser. No. 07/615,071 or U.S. Pat. No. 5,101,940 or any other suitable connection assembly, and three circumferentially equi-spaced apart connection assemblies are used for each braking disc, two connection assemblies secure one segment to the web and one connection assembly serves the other like segment to the web. In such a construction the diametrically opposed overlapping end edge regions are preferably located adjacent to the two attachment means securing said one segment to the web, with each end edge region of said one segment overlapping an end edge region of said other segment. In this way the end edge regions of said one segment hold the respective end edge regions of said other segment against warping away from the web after continued heating and cooling under braking.

If four circumferentially equi-spaced apart connection assemblies are provided for each braking disc, the two like disc segments of the preferred embodiment may have the two diametrically opposed overlapping end edge regions each positioned equi-distantly from two adjacent attachment means. However, preferably each overlapping end edge region is located nearer to one of two adjacent attachment means, with the segments secured to the web by the respective attachment means, overlapping over the edge region of the contiguous segment to thus resist the previously mentioned warping.

The present invention will now be further described, by way of example, with reference to the accompanying drawings, in which.

Figure 1:
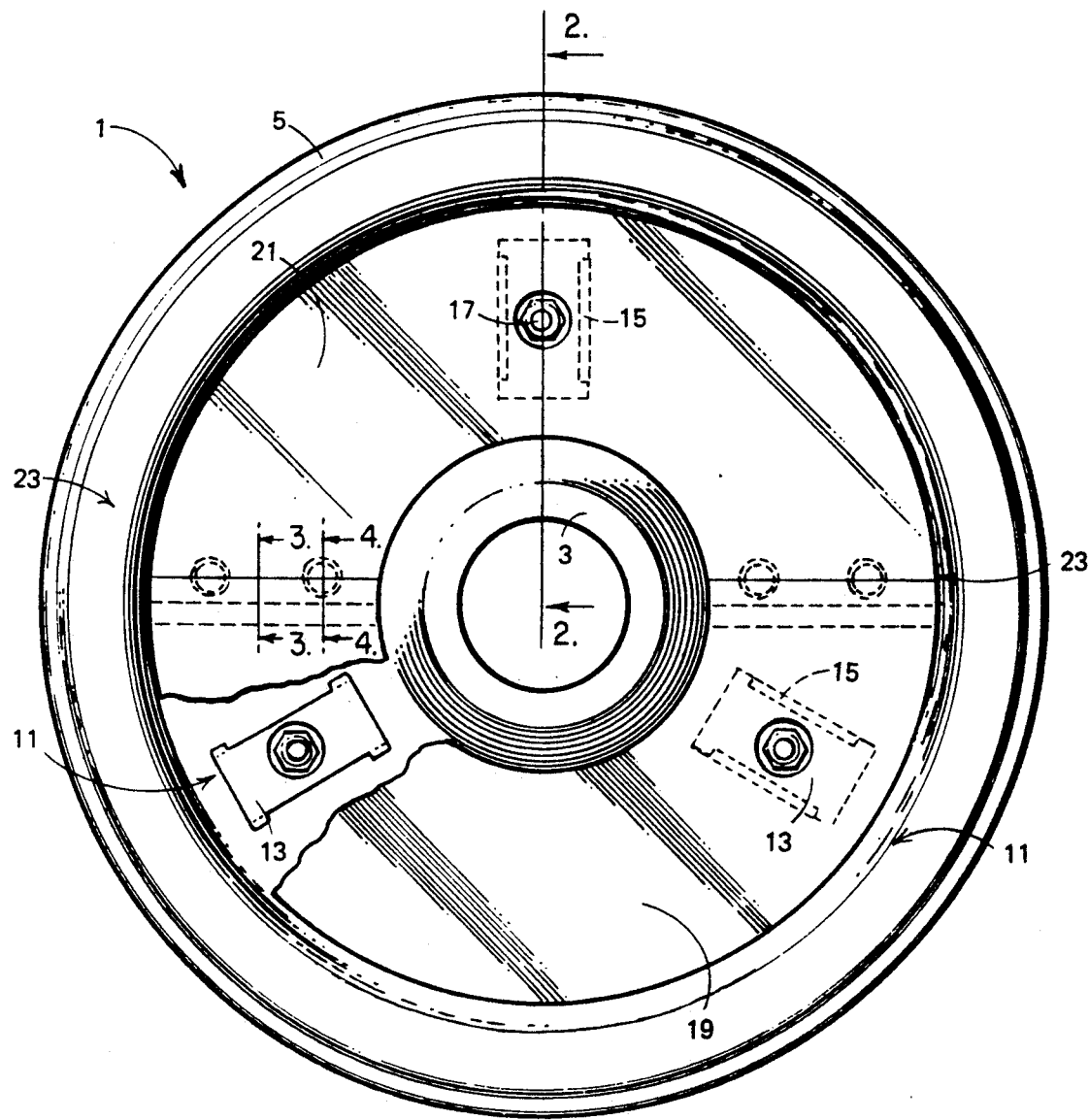
FIG. 1 is a front view of a preferred embodiment of the present invention, each braking disc being secured to the wheel web by three attachment means.
Figure 2:
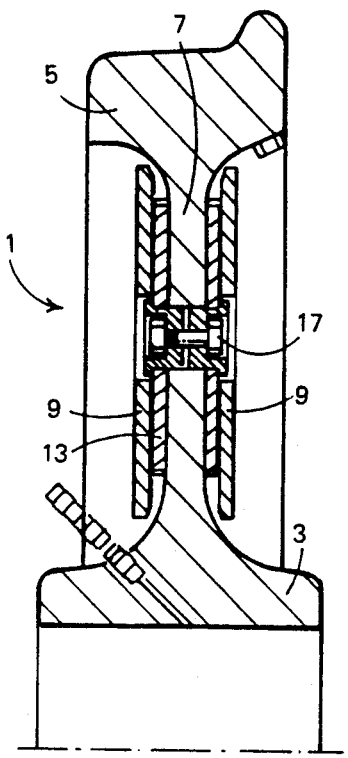
FIG. 2 is an axial cross-sectional view taken substantially on the line 2—2 of FIG. 1.

The preferred embodiment of the present invention illustrated in FIGS. 1 to 5 of the accompanying drawings comprises a wheel generally designated 1, the wheel having a central hub 3 and an outer rim 5, the rim 5 being connected to the central hub 3 by a radially extending planar web 7. An annular disc 9 is secured to each side of the web 7 by attachment means in the form of three circumferentially equi-spaced apart connection assemblies 11 as described in Ser. No. 07/615,701. Each connection assembly 11 comprises a rectangular steel spring mounting plate 13 which is located in a radially extending dovetail slot 15 in the back of an annular disc 9. The mounting plate 13 is bolted to the web 7, tightening of bolts 17 causing the mounting plates 13 to deflect, thus causing an axial force to be applied to the annular braking disc 9 holding the braking disc 9 against the web 7. As best seen from FIG. 1 of the accompanying drawings, each annular braking disc 9 is comprised of two substantially alike curved segments 19,21 with one segment 19 attached to the web 7 by two connection assemblies 11 and the other segment 21 attached to the web 7 by one connection assembly 11. Adjacent to the connection assemblies 11 for said one segment 19 are overlapping end regions 23 of the segments 19,21, this overlapping edge construction being best seen in FIGS. 3, 4 and 5 of the accompanying drawings. The end edge construction 24 for each end of the segment 19 is the same and comprises a reduced thickness region 25 which thickens to form an end section 27 and a groove 29, the end section 27 effectively providing a section 31 which extends axially of the braking disc 9 in the completed disc. This end section 27 has an end face 35 in which two part-cylindrical recesses 37 are formed, a radially inwardly directed flange 39 being provided at the end of each recess 37 flush with the braking surface 41 of the segment 19. Considering now the other segment 21, this also has like end edge constructions 22 which are each substantially complementary to the end edge constructions 24 of segment 19. Each end edge construction 22 for the segment 21 comprises a reduced thickness portion 43 which thickens to form an end section 45 and a groove 47, the end section 45 effectively providing a section which extends axially of the braking disc 9 in the completed disc, in the opposite direction to section 27. A wall 49 of the groove 47, remote from end section 45, has two part-cylindrical recesses 51 formed therein, which recesses 51 extend as circular through bores 52 through the reduced thickness portion 43, a radially inwardly directed flange 53 being provided at the end of each recess 51 flush with the braking surface 41 of the segment 21.

On assembly, end section 27 of each end of segment 19 is engaged in the groove 47 at each end of segment 21, sections 45 then engaging in grooves 29. In this position part-cylindrical recesses 37 and 51 are aligned to define two parallel bores and by inserting spring means in the form of a roll pin 55 through each bore 52 to a position between the facing recesses 37 and 51, the segments 19,21 are biassed circumferentially apart to thus firmly interengage faces 57 and 59 of the end sections 31 and 45 respectively. Said end sections 27 and 45 will normally engage with clearance in the grooves 47 and 29 so that the roll pins 55 take up the clearance. In this position flanges 39 and 53 define small access apertures 61. Thus the end regions of the segments 19,21 are securely interengaged thereby resisting centrifugal forces.

Further, as is evident from FIG. 1 of the accompanying drawings, the connection assemblies 11 securing the segment 19 to the web 7, are located adjacent to the overlapping end regions of the segments. Thus, by virtue of the fact that the end regions of the segment 19 overlap the end regions of segment 21, the end regions of the segment 21 are held against deflection away from the web 7, thus maintaining a smooth planar profile for the braking surface 41.

Figure 3:
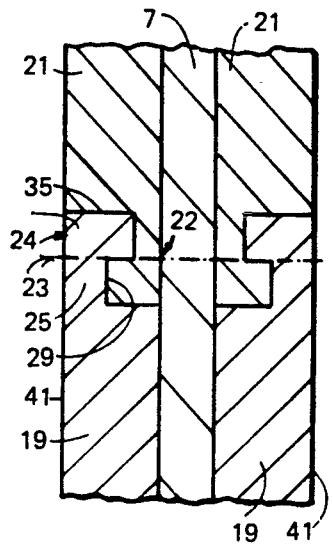
FIG. 3 is a cross-sectional view along line 3—3 in FIG. 1.
Figure 4:
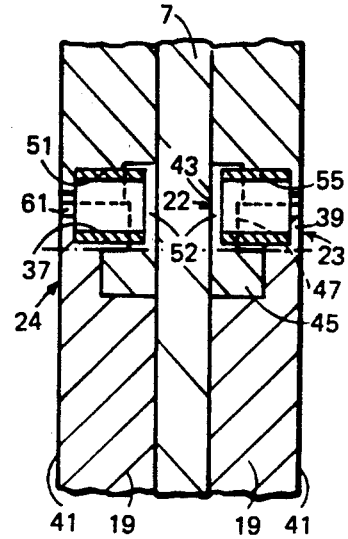
FIG. 4 is a partial cross-sectional view along line 4—4 in FIG. 1.
Figure 5:
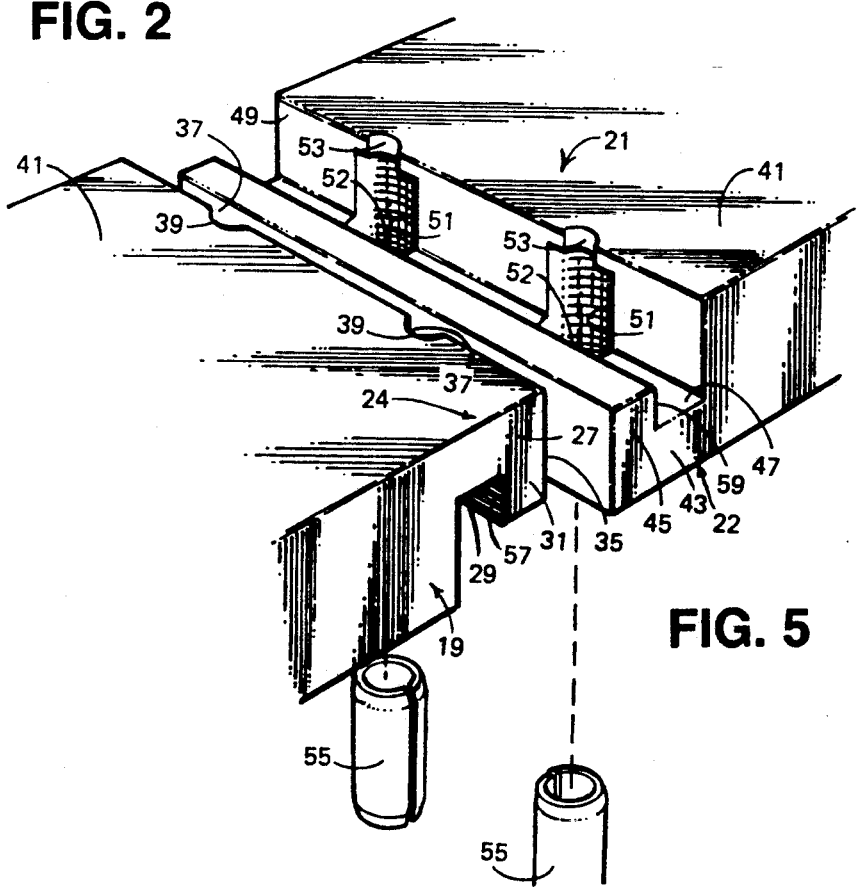
FIG. 5 is an exploded perspective view of the overlapping connection between adjacent brake disc segments.
Figure 6:
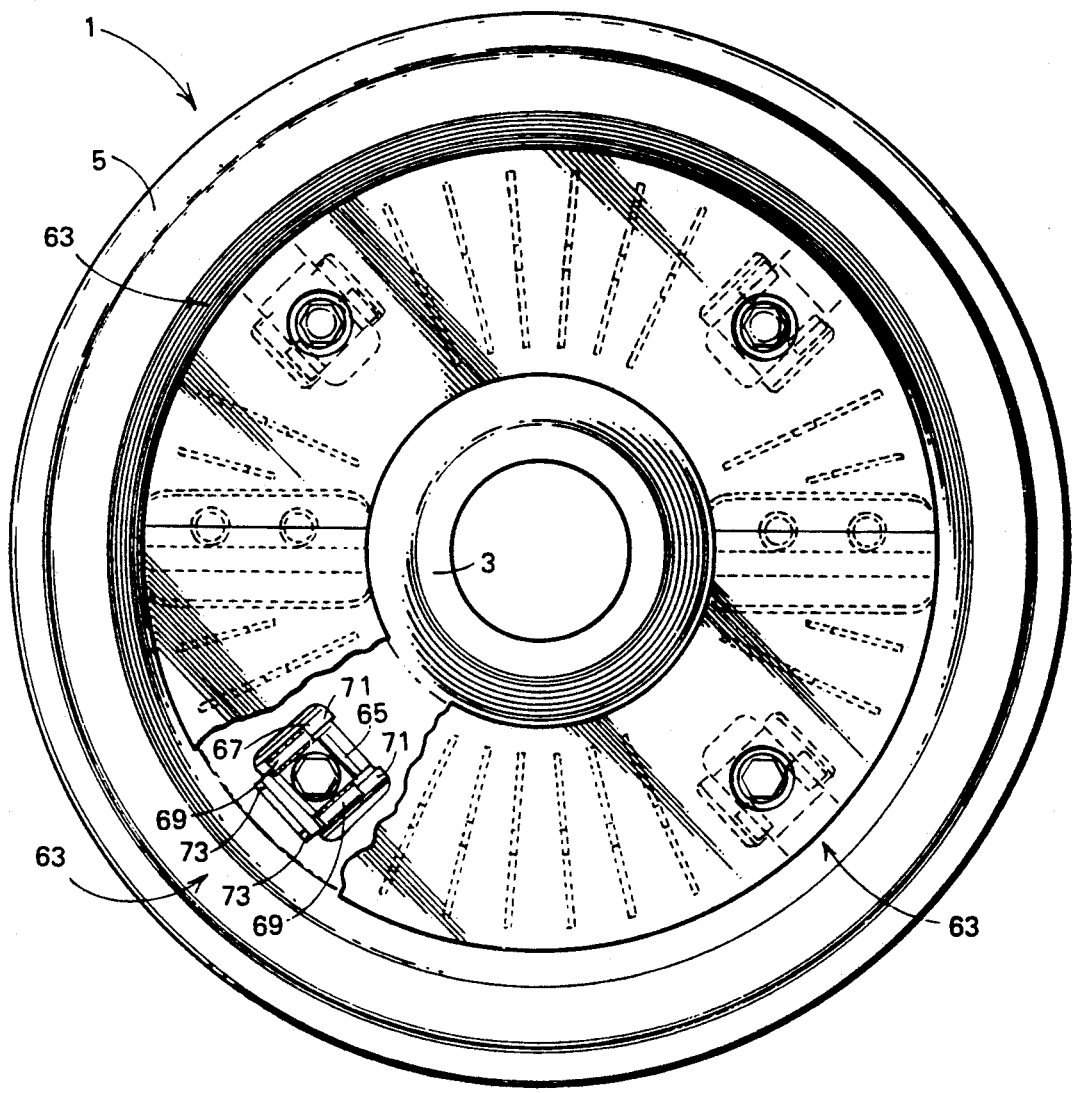
FIG. 6 is a front view of a second embodiment of the present invention, each braking disc being secured to the wheel web by four attachment means.
Figure 7:
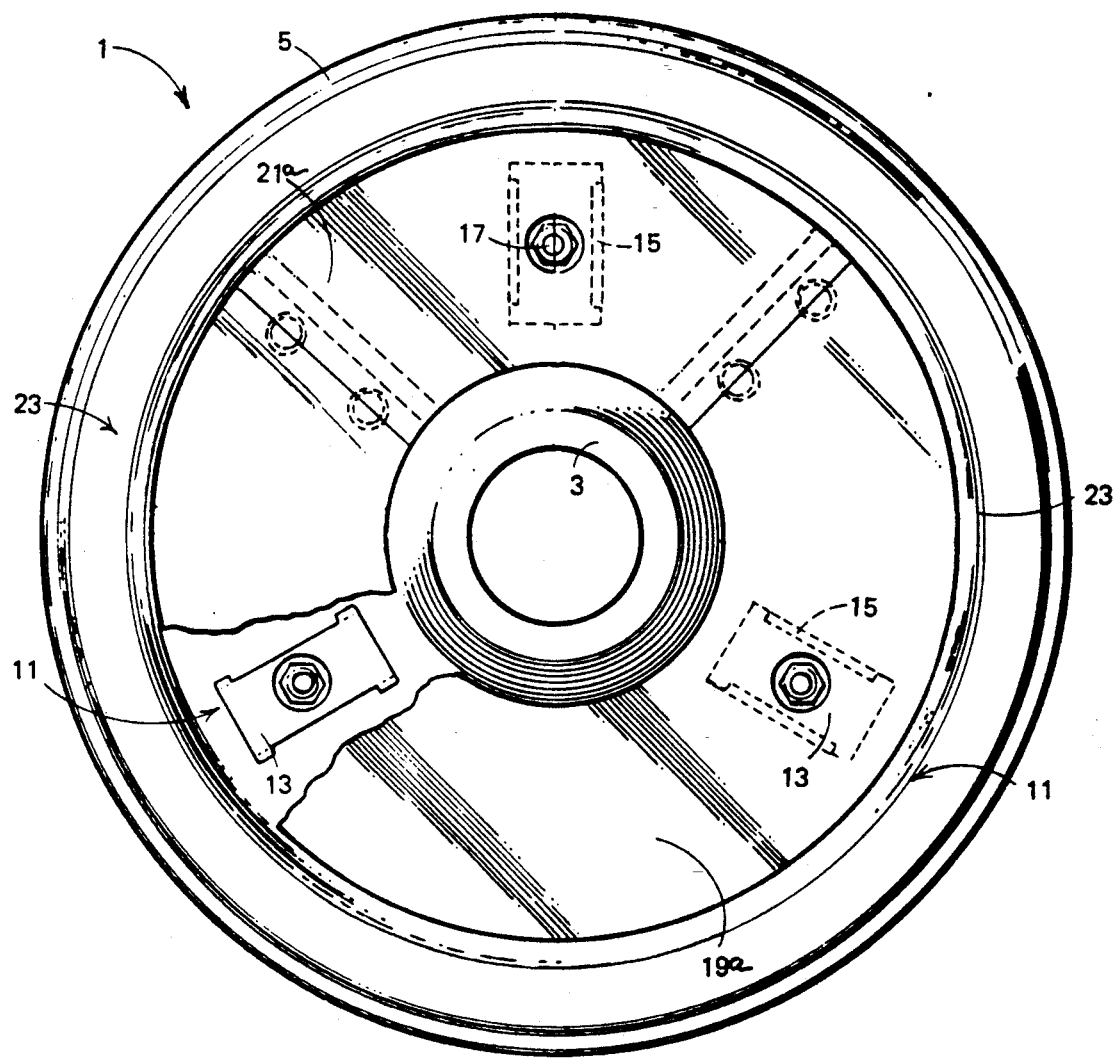
FIG. 7 is a front view of a third embodiment of the present invention.

In the construction illustrated in FIG. 6 of the accompanying drawings, the same reference numerals are used to identify the equivalent parts to those used in the embodiment of FIGS. 1 to 5. The main difference between the embodiments lies in the use of different attachment means, the attachment means being in the form of four circumferentially equi-spaced apart connection assemblies 63. These connection assemblies 63 are as disclosed in U.S. Pat. No. 5,101,940, each comprising a mounting block 65 which is located in a radial guideway 67 machined in the back face of the annular braking disc 19,21. The mating faces of the block 65 and guideway 67 incorporate radial half holes which form enclosures into each of which is fitted a roll pin 69. The roll pins 69 are held in position by projections 71 at one end of the guideway 67 and by lateral projections 73 on the mounting block 65. Thus, when the mounting block is bolted to the web 9, the roll pins are secured in position. As shown in FIG. 6, each segment 19,21 is secured to the web 9 by two connection assemblies 63 with the overlapping end edge constructions for the segments being as illustrated in FIGS. 3, 4 and 5. One difference is that whilst one end region of segment 19 overlaps one end region of segment 21, the other end region of segment 21 overlaps the other end region of segment 19. This is not essential with the illustrated construction wherein the overlapping end edge constructions are located equi-distantly from two adjacent connection assemblies 63. However, two of the connection assemblies 63 are positioned adjacent to the overlapping end regions as is preferable if the segment attached to the web 9 by one of said two of the connection assemblies 30 overlaps the contiguous end edge region of the other segment to thus hold the other segment against the web 9 and maintain a smooth planar braking surface 41.

By virtue of the fact that the overlapping end edge regions 23 of the brake disc segments 19,21 of the present invention cause the segments 19,21 to be effectively interlocked with each other, the segmented brake disc 9 as a whole has a hoop stress characteristic which is virtually the same as a unitary construction brake disc, the segmented brake disc 9 resisting centrifugal forces in the same manner as a unitary construction brake disc and enabling a minimal number of attachment means 11 to be used to secure the brake disc 9 to the wheel web 7. This is in contrast to prior art segmented discs wherein a large number of attachment means were required to secure a disc segment to a wheel web and resist centrifugal force.

Whilst the above described preferred embodiments of the present invention utilise two like curved segments 19,21 which interlock together to form a completed brake disc 9, segments with different angular extents can be alternatively used e.g. one segment could have a 270° angular extent whilst the other segment would then have a 90° angular extent, to thus together form a complete disc 9. Due to the overlap of the brake disc segments of the present invention, two like curved segments must necessarily be constructed from two annular disc blanks. Thus for two braking discs for a wheel, four annular disc blanks are required for manufacturing purposes. However, advantage can be gained in respect of the manufacture of braking discs from different shaped segments. To explain, if one segment of each braking disc has a 270° angular extent and the other has a 90° angular extent, then clearly three braking discs can be manufactured from four complete disc blanks, three blanks being used to produce the 270° segments whilst one disc blank can produce the required three 90° segments. Thus three discs result from four blanks as opposed to two discs from four blanks when like-shaped segments are used. This is a clear saving manufacturewise. When different shaped segments are used, the attachment means are located in the middle of the smaller segment and the end regions of the smaller segment preferably overlap the end regions of the large segment to at least reduce possible warp.

The present invention thus provides a segmented brake disc construction which offers similar performance to that of an integral annular braking disc, thereby facilitating replacement of an integral disc without any performance loss, should such an integral disc fail during the life of a wheel.

I claim:

1. A wheel comprising a central hub and an outer rim interconnected by a web, a pair of annular braking discs being mounted one on each side of the web, each annular braking disc being secured to the web by at least two attachment means, each of said discs comprising at least two curved segments, each curved segment having two end edge regions, each end region of each segment overlapping the end region of an adjacent segment so that a continuous annular braking disc with a smooth braking surface is provided, the overlapping end edge regions having sections which extend generally axially of the braking disc in opposite directions, said sections interengaging with each other to resist centrifugal forces, and spring means located between said overlapping end regions to bias said overlapping end regions circumferentially away from each other with respect to the annular braking disc, to thus securely interengage the segments.

2. A wheel according to claim 1, wherein the overlapping end edge regions are each located adjacent to a respective attachment means with the braking disc, that segment secured by said adjacent attachment means to the web overlapping a contiguous end edge region of the adjacent segment to hold the contiguous end edge region of the adjacent segment against movement away from the web.

3. A wheel according to claim 1, wherein said spring means takes the form of at least one cylindrical roll pin which is located between opposed curved faces of the overlapping end edge regions of the brake disc segments.

4. A wheel according to claim 1, wherein each annular braking disc is comprised of two curved segments of like angular extent.

5. A wheel according to claim 4, wherein three spaced apart attachment means secure each annular braking disc to the web, two attachment means securing one curved segment to the web and one attachment means securing the other curved segment to the web, the end edge regions of said one curved segment overlapping and holding the respective end edge regions of said other curved segment against the web.

6. A wheel according to claim 5, wherein the attachment means securing said one segment to the web are located adjacent to the respective end regions of said one segment.

7. A wheel according to claim 4, wherein four spaced apart attachment means are provided for each braking disc.

8. A wheel according to claim 7, wherein two diametrically opposed overlapping end edge regions are each positioned equi-distantly between two adjacent attachment means.

9. A wheel according to claim 7, wherein two diametrically opposed overlapping end edge regions are each located nearer to one of two adjacent attachment means.

10. A wheel according to claim 9, wherein the end edge region of the segment secured to the web by a nearer attachment means, overlaps the edge region of a contiguous segment to hold said contiguous segment against movement away from the web.

11. A wheel according to claim 1, wherein each annular braking disc is comprised of two segments with different angular extents.

12. A wheel according to claim 11, wherein the segment having the shorter angular extent is secured to the web by one attachment means and the other segment is secured to the web by two attachment means.

13. A wheel according to claim 12, wherein the end edge regions of the shorter segment each overlap and hold an end edge region of the longer segment against the web.

* * * * *